United States Patent
Falcon

(10) Patent No.: US 9,654,889 B2
(45) Date of Patent: *May 16, 2017

(54) DEVICE, SYSTEM AND METHOD FOR MEASUREMENT OF MEDIA CONSUMPTION IN DIGITAL MEDIA TERMINALS

(71) Applicant: The Nielsen Company (US), LLC, Schaumburg, IL (US)

(72) Inventor: Fernando D. Falcon, Lugano (CH)

(73) Assignee: The Nielsen Company (US), LLC, New York, NY (US)

(*) Notice: Subject to any disclaimer, the term of this patent is extended or adjusted under 35 U.S.C. 154(b) by 243 days.

This patent is subject to a terminal disclaimer.

(21) Appl. No.: 14/537,262

(22) Filed: Nov. 10, 2014

(65) Prior Publication Data

US 2015/0063576 A1 Mar. 5, 2015

Related U.S. Application Data

(63) Continuation of application No. 13/192,191, filed on Jul. 27, 2011, now Pat. No. 8,885,840, which is a
(Continued)

(30) Foreign Application Priority Data

Jan. 28, 2009 (GB) .................................. 0901445.7

(51) Int. Cl.
*H04R 29/00* (2006.01)
*G06Q 30/02* (2012.01)
(Continued)

(52) U.S. Cl.
CPC ............. *H04R 29/00* (2013.01); *G06Q 30/02* (2013.01); *H04H 60/31* (2013.01); *H04H 60/37* (2013.01);
(Continued)

(58) Field of Classification Search
CPC ........ H04H 60/58; H04H 60/31; H04H 60/37; G10L 21/0208; H04R 29/00
(Continued)

(56) References Cited

U.S. PATENT DOCUMENTS 6,241,612 B1 6/2001 Heredia
6,304,865 B1 10/2001 Christensen et al.
(Continued)

FOREIGN PATENT DOCUMENTS

WO 03073210 9/2003
WO 2005032146 4/2005
(Continued)

OTHER PUBLICATIONS

International Searching Authority, "International Search Report," issued in connection with corresponding International PCT Application No. PCT/IB2010/000283, mailed on Jun. 4, 2010, (3 pages).
(Continued)

*Primary Examiner* — Josep Saunders, Jr.
(74) *Attorney, Agent, or Firm* — Hanley, Flight & Zimmerman, LLC

(57) ABSTRACT

Example methods disclosed herein to monitor media presented by a media device include adjusting, with a circuit, an inbound audio signal input to the media device based on (i) a level of an outbound audio signal generated by the media device and (ii) a level of the inbound audio signal to produce an adjusted inbound audio signal. Such disclosed example methods also include combining, with the circuit, the adjusted inbound audio signal with a sampled version of the outbound audio signal to determine a return signal. Such disclosed example methods further include processing the return signal to determine first identification information to
(Continued)

identify first presented media having an audio portion corresponding to the outbound audio signal generated by the media device.

20 Claims, 11 Drawing Sheets

Related U.S. Application Data continuation of application No. PCT/IB2010/000283, filed on Jan. 28, 2010.

(51) Int. Cl.
　　*H04H 60/31*　　(2008.01)
　　*H04H 60/37*　　(2008.01)
　　*H04H 60/58*　　(2008.01)
　　H04M 9/08　　(2006.01)
　　H04H 20/31　　(2008.01)

(52) U.S. Cl.
　　CPC ............. *H04H 60/58* (2013.01); *H04H 20/31* (2013.01); *H04H 2201/50* (2013.01); *H04H 2201/90* (2013.01)

(58) Field of Classification Search
　　USPC ........................................ 379/406.01–106.16
　　See application file for complete search history.

(56) References Cited

U.S. PATENT DOCUMENTS

| | | |
|---|---|---|
| 6,925,177 B2 | 8/2005 | Nishimura |
| 7,647,604 B2 | 1/2010 | Ramaswamy |
| 7,827,312 B2 | 11/2010 | Ramaswamy et al. |
| 2004/0064319 A1 | 4/2004 | Neuhauser et al. |
| 2006/0242325 A1 | 10/2006 | Ramaswamy et al. |
| 2007/0055500 A1 | 3/2007 | Bilobrov |
| 2007/0217600 A1 | 9/2007 | Kim |
| 2008/0126420 A1 | 5/2008 | Wright et al. |
| 2008/0263579 A1 | 10/2008 | Mears et al. |
| 2010/0153982 A1 | 6/2010 | Ramaswamy |
| 2011/0016231 A1 | 1/2011 | Ramaswamy et al. |

FOREIGN PATENT DOCUMENTS

| | | |
|---|---|---|
| WO | 2006055971 | 5/2006 |
| WO | 2007048124 | 4/2007 |
| WO | 2007056624 | 5/2007 |

OTHER PUBLICATIONS

International Searching Authority, "Written Opinion," issued in connection with corresponding International PCT Application No. PCT/IB2010/000283, mailed on Jun. 4, 2010, (5 pages).

Intellectual Property Office, "Search Report," issued in connection with corresponding Great Britain Application No. GB0901445.7, mailed on Nov. 16, 2009, (3 pages).

Intellectual Property Office, "Examination Report under Section 18(3)", issued in connection with GB Application No. 0901445.7, mailed on Sep. 26, 2013, 5 pages.

Untied States Patent and Trademark Office, "Non-Final Office Action", issued in connection with U.S. Appl. No. 13/192,191, dated Dec. 19, 2013 (9 pages).

Untied States Patent and Trademark Office, "Notice of Allowance", issued in connection with U.S. Appl. No. 13/192,191, dated Jul. 8, 2014 (5 pages).

Arbitron, "Electronic Audience Measurement for the 21st Century", <http://www.arbitron.com/downloads/IntIPPMOverview.pdf>, Summer 2003 (37 pages).

DEVICE, SYSTEM AND METHOD FOR MEASUREMENT OF MEDIA CONSUMPTION IN DIGITAL MEDIA TERMINALS

RELATED APPLICATION(S)

This patent arises from a continuation of U.S. patent application Ser. No. 13/192,191 (now U.S. Pat. No. 8,885, 840), entitled "Device, System and Method for Measurement of Media Consumption in Digital Media Terminals" and filed on Jul. 27, 2011, which is a continuation of International Application Sererial Number PCT/IB2010/ 000283, entitled "Device, System and Method for Measurement of Media Consumption in Digital Media Terminals" and filed on Jan. 28, 2010, which claims priority from U.K. Patent Application No. GB 0901445.7, entitled "Device, System and Method for Measurement of Media Consumption in Digital Media Terminals" and filed on Jan. 28, 2009. U.S. patent application Ser. No. 13/192,191, International Application Serial Number. PCT/IB2010/000283 and U.K. Patent Application No. GB 0901445.7 are hereby incorporated by reference in their respective entireties.

FIELD OF THE DISCLOSURE

The present disclosure relates to apparatus and methods for measuring the consumption of media in different types of digital media terminals.

BACKGROUND

The term digital media terminal (hereinafter "DMT") is used herein to describe any electronic device capable of rendering media (e.g. playing back recorded or broadcasted audio/video) to a user and recording user generated media (e.g. recoding or transmitting audio/video). Digital media terminals can be found today in the markets in various embodiments, including desktop personal computers, laptop devices (such as notebook computers) and handheld devices (such as mobile "smart" phones. Such devices are becoming a preferred way of consuming media by, for example, playing downloaded or streamed audio and video content. Audio clips may range from streamed radio, to a variety of audio podcasts such as news, weather or finance reports, audio books, education, and training podcasts, music podcasts, health services and self-help podcasts, etc. In the specific case of streamed video, also known in the industry as 'on-line video', the content may range from short clips lasting a couple of minutes, to full length TV programs which are offered through both traditional broadcasting mechanisms and data networks as well (e.g., Internet). New ways of consuming media are becoming increasingly popular, such as "Web TV" (i.e., live streaming through Internet of TV channels), "Catch-up TV" (i.e., downloading or streaming a TV program which has been broadcasted in traditional broadcasting networks during a previous period of time), and video-on-demand (i.e. downloading or streaming any piece of video content from a catalogue).

These new media consumption trends have opened the way to new advertising markets, and therefore measuring audiences became a need in such markets.

Several methods have been attempted to track and measure this type of on-line audio/video media consumption. One solution currently used by companies that measure Web site traffic relies on software programs running at the video servers generating the video streams (or alternatively at dedicated measurement servers invoked by "tags" included in web pages) that keep track of the exact number of video sessions (also known as "site centric" approach). Such approach usually provides accurate information about media items streamed or downloaded, but provide little (if any) information about actual consumers (e.g. geographical data obtained from IP addresses).

A second approach exists by which a "software meter" is installed in a number of computers participating in a continuous survey in the form of a "panel". Such software meters are able to detect and log internet activity, mostly in the form of WWW page visits and file downloading (hereinafter "WWW loggers"). Such approach is usually referred to as a 'user centric' method, since they measure the actions performed by known individuals (in terms of media consumption) as opposed to measuring activity in servers (where users may not be individualized). User centric methods resemble the methodology used in measurement of television audiences (i.e. it comprises a panel of users who accept to be monitored). WWW loggers usually capture and report many types of interactions of their users with their personal computers and the worldwide web, including streaming video and downloading of files of various kinds. Basically, such approach allows knowing who has seen which websites, for how long and in which order. User centric methods have the advantage of providing precise demographical information about users, although restricted by inherent limitations in terms of panel size and panel balance (i.e. panels must evenly represent the universes they describe, which means that all categories must be proportionally included in the panels).

Many 'user centric' solutions based on WWW loggers attempt to track exposure to content through the identification of URL addresses (Uniform Resource Locator) used in the World Wide Web. The URL is basically an address that specifies the location of a file on a server connected to the Internet, and it specifies the exchange protocol to be used, port number, domain name, subdirectory names, file name, etc. In order to determine what content has actually been streamed or downloaded, each URL must be univocally linked to a specific content item identified in the web space. For this reason, tables associating media items available on the web space to URLs are required before any meaningful audience figures can be obtained. These tables need to be updated every time a change is introduced, which makes the process extremely burdensome and error-prone when the number of possible items becomes too large. Moreover, such relationship between URLs and content files is not guaranteed since some advanced programming methods do not use fixed URL addresses but dynamic ones that may not bear a direct correspondence to media files, which makes such a task unfeasible.

Furthermore, new programming techniques are becoming more popular among software developers that avoid the use of URLs (beyond the initial access to a portal page), which makes the linking between URL and media files unusable.

Moreover, current implementations of WWW logger measurement services cannot track time-shifted consumption, i.e., consumption of media that has been downloaded at one point in time, and consumed at a later point in time. In such cases, most WWW loggers cannot keep track of content that has been stored and consumed at a different time; such software applications can only track Internet browsing activity and other interactions with the World Wide Web in "real time", i.e. "as it happens".

In order to overcome such limitations, more functionality would be required from such software meters, so that they are able to track the activity of any type of media player, with the added capability of recognizing and reporting all content consumed through the use of the digital media terminal.

To complicate things further, even streamed content—as would be the case of on-demand video services—may not necessarily imply that the associated content is been viewed during the streaming session. A large variety of software applications are available that allow recording of audio and video streaming (also known as 'stream rippers'). Content may be downloaded (i.e. recorded) through these methods and never played back, or played back only partially. Such methods based on logging WWW activity cannot detect and report accurately this type of media consumption.

Another limitation of WWW loggers is given by the increasing amount of peer-to-peer content sharing. Once the content is downloaded from an original server, the total number of users that access the data file is impossible to track. The only viable way to track audiences to such content files is though a 'user centric' (i.e., panel based) approach and using a content identification technique that reports any kind of exposure to such media.

Beyond the above discussed topic of the accuracy of 'site-centric' and 'user centric' methods for the audience measurement of on-line media consumption, time shifted viewing, and peer-to-peer content sharing, an issue that is highly relevant when using WWW loggers is privacy. In order to provide an accurate report of media consumption, WWW loggers need to track all browsing activity as well as use of other software applications, sometimes including keyboard activity. This becomes a privacy issue for many users.

A theoretical solution would be available to overcome many of the problems associated to measurement systems based on activity logs through the use of content identification techniques. Such theoretical solution would require the use of complex software techniques to intercept the audio or video stream being played back by the DMT in order to attempt identification of such content through some suitable method, such as detecting an embedded audio code or watermark, or comparing signatures or fingerprints of such streams.

However, such solution is not feasible since most operating systems running on digital media terminals do not provide any standard way of accessing digital audio streams being played back by the DMT for the purpose of copyright protection. For example, Microsoft® has implemented in its latest operating system Windows Vista™ a feature called "Protected Media Path" that makes it impossible to tap into any of the audio or video digital streams produced within the system, to protect that media content from any kind of tampering. Any method based on such principles cannot be implemented in standard operating systems, or cannot be guaranteed to work on every version and all possible configurations thereof.

Even if the playback digital stream would not be protected, such a solution would suffer from other problems that would make it impractical. For example, in the Windows XP environment it is possible to write a virtual audio driver software that can intercept any audio played back through any application running in that operating system, but only if the virtual audio driver is defined as the system's "default audio device". Such a solution cannot ensure stable and uninterrupted operation, in all possible situations and all possible configurations, because it relies on software techniques that act at the lowest layers of the system. For example, such virtual drivers may interfere with preinstalled drivers or bear incompatibilities with other installed hardware devices, or may even change audio settings of the host digital media terminal every time it is invoked, hindering its normal use as a media player or as a communications device. That, in turn, significantly increases the risk of users refusing the installation of such software in their digital media terminals, or abandoning the panels for being excessively burdened by these inconveniences.

The aforementioned limitations of all known methods seriously limit the capabilities of any user-centric approach due to the impossibility of implementing a homogenous method across all possible distribution platforms and all types of DMTs. This drawback seriously compromises the representativeness and balance of statistical samples, which is a prerequisite of any audience measurement process.

SUMMARY

The invention is set out in the claims. A loop-back device derives a return signal from an outbound signal of a DMT. The return signal, carrying a sample signal derived from the outbound signal, is routed back to the same DMT through standard inbound audio facilities so that it can be captured by a conventional audio processing software application for content identification. The return signal may be derived by mixing the sample signal with an eventual inbound signal (for example, a conventional microphone used with the DMT for capturing human voice) producing thus a combined signal that contains the outbound signal and any eventual inbound signal. The mix so produced is then routed back into the DMT via a signal path connected to standard inbound audio facilities.

Because in most practical applications audio flows alternatively either outbound (i.e. from the DMT to the user, for example while consuming audiovisual media) or inbound (i.e. from the user to the DMT, for example while speaking into a microphone in a phone conversation), the return signal produced by the loop back device contains in most cases either the sample signal or the original inbound signal, in mutual exclusivity. This is true most of the time even in DMT applications involving the users (as for example in a phone conversation), since human beings tend to talk and listen at different times (i.e. not simultaneously). This natural propensity of users of employing outbound/inbound audio facilities alternatively while operating a DMT allows the utilization of those same standard audio facilities for audience measurement purposes, capturing samples of the media items consumed by those users without interfering in any significant way with the normal use of the DMT. Eventual interruptions observable in the sample signal given by sporadic activity in the inbound signal while capturing exposure to media do not affect the validity of the method as a statistical sampling mechanism for audience measurement purposes.

Because the invention uses standard outbound/inbound audio facilities that are included in the vast majority of digital media devices, conventional techniques can be used advantageously to capture the return signal, allowing capturing of most media exposure situations using substantially the same technique in various distribution platforms and types of DMTs. The loop-back device can be implemented by a relatively simple electronic circuit connected to a standard outbound audio facility of the monitored DMT. Such circuit produces an attenuated sample of the signal sent to an audio rendering device (used to reproduce such audio material, such as speakers connected to the DMT).

The present invention ensures that the media content to be monitored is captured "as rendered" to the user, using standard audio capturing software of the monitored DMT.

The present invention enables seamless and homogenous implementation of the method across different types of DMTs, hence enabling the construction and maintenance of balanced "user-centric" panels.

The present invention can be implemented advantageously at a marginal cost in those situations where a system is already in place for measuring audiences for other types of platforms (for example television), extending the capturing capabilities of such system to cover new digital distribution platforms while utilizing existing content identification facilities.

The present invention can be implemented without altering the media consumption habits of monitored users, beyond the extent to which the use of such loop-back device may do so.

The present invention can be implemented guaranteeing the privacy of users beyond the reporting of exposure to publicly available audio material, not relying on detailed logging of all browsing activity (even beyond media consumption purposes).

The present invention is particularly useful for monitoring media exposure through the use of headphones in a relatively simple and cost-effective way.

DETAILED DESCRIPTION

Figure 1:
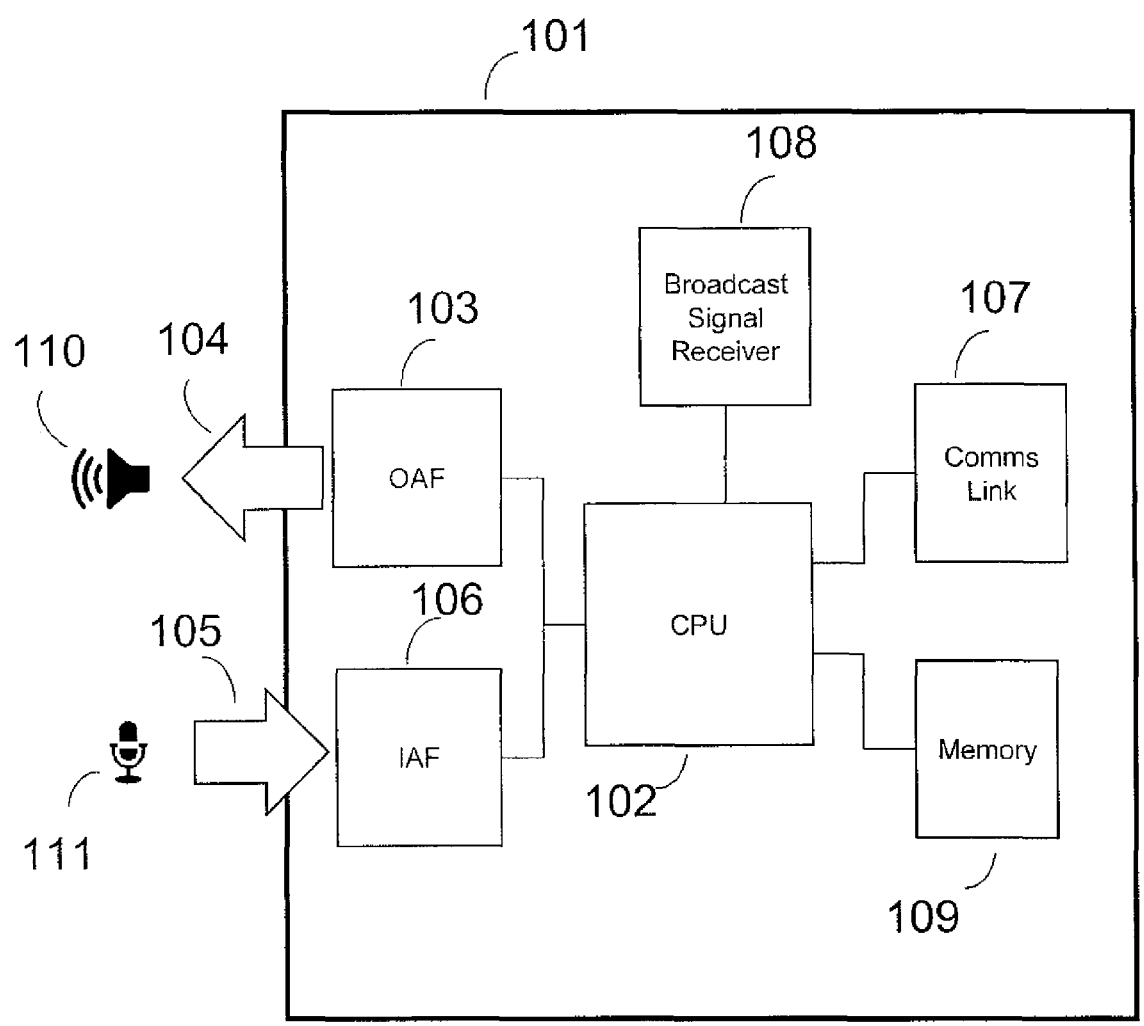
FIG. 1 is a block diagram of a digital media terminal used for media consumption.

FIG. 1 shows a block diagram of a typical digital media terminal 101 used for media consumption, including a central processing unit 102, an outbound audio facility 103, an inbound audio facility 106, a communications link 107, one or more broadcast signal receivers 108 and a memory 109.

Digital media terminal 101 may be, for example, a desktop personal computer (PC), a laptop PC, a handheld PC, a mobile communications device, a DVD player, a portable media player, a game console, a portable game console, a music player, a portable music player, or any other type of device including media playback and information storage capabilities.

Outbound audio facility 103 may be any combination of hardware and/or software elements capable of producing an outbound signal 104 driving an audio rendering device 110. Examples of audio rendering devices include a speaker, a headset, an earphone, etc. The inbound audio facility 106 may be any combination of hardware and/or software elements capable of capturing an inbound signal 105, allowing connection of an audio sensing device 111 to digital media terminal 101 (such as a microphone or some other kind of external audio source).

Digital media terminal 101 may be equipped as well with communication capabilities (represented in FIG. 1 by "Comms link 107") which may include any combination of hardware and software elements allowing a data connection (e.g., WiFi, Ethernet, ADSL, GPRS, UMTS, CDMA, WiMax, etc.). Digital media terminal 101 may be also equipped with broadcast signal receiver 108, which may include for example: a digital terrestrial television decoder, a mobile television receiver, a satellite television receiver, or any combination of hardware and software elements capable of receiving media through a broadcast signal. Memory 109 may include any type of computer data storage means, both volatile and non-volatile.

Content identification technologies may be implemented in a digital media terminal by means of a software application running on the same device being monitored for media measurement purposes. Known content identification technologies may include: methods based on matching audio signatures or fingerprints, on extraction of embedded audio codes, detection of specific content features, etc. Such software application must be capable of processing a given digital signal stream obtained from a standard audio facility of digital media terminal 101, according to what is prescribed for the content identification technology used (for example, generating a signature or extracting an ID code or fingerprint). Such software application may realize also the functions of storing that information in a memory resource of digital media terminal 101, and further transmitting the information to a central processing base, whenever a communication link with such base becomes available (e.g. an Internet connection).

Figure 2:
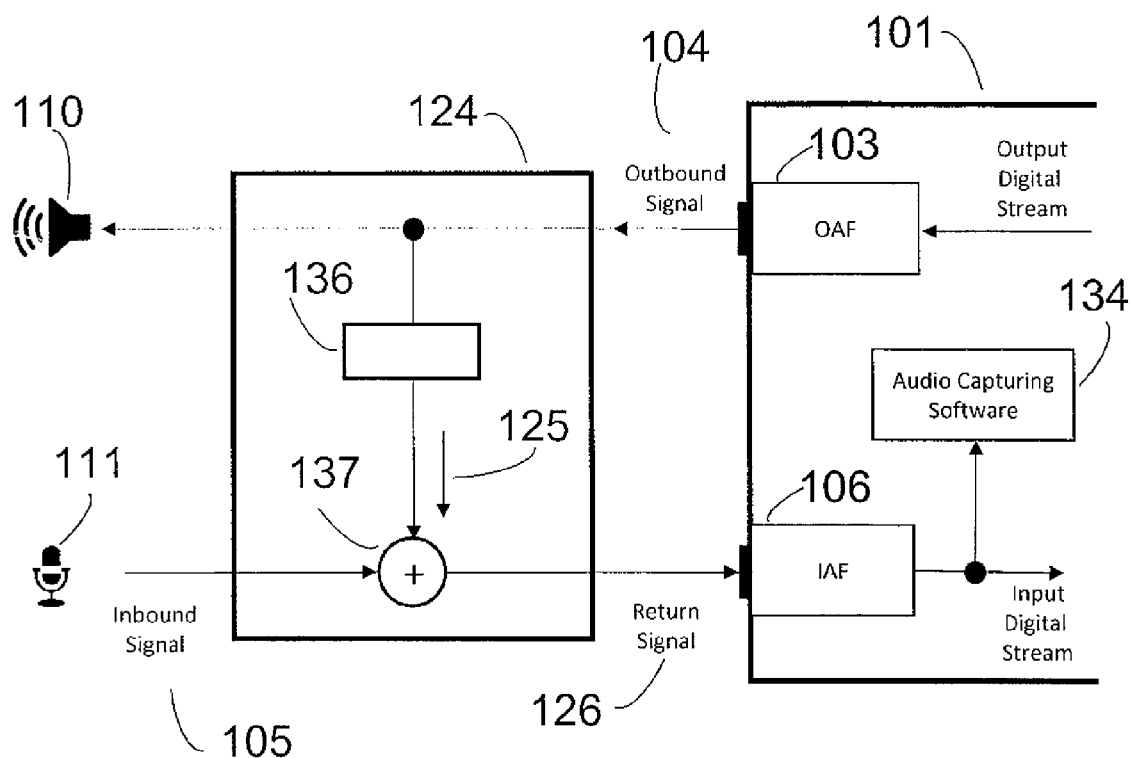
FIG. 2 is a block diagram of a loop-back device according to the present invention.

FIG. 2 shows a block diagram of a loop-back device 124 according to the present invention. In most embodiments, loop-back device 124 is inserted in the outbound and inbound signal paths between digital media terminal 101 and audio rendering device 110 and audio sensing device 111, coupled to outbound signal 104 and inbound signal 105. Loop-back device 124 is connected to outbound audio facility 103 and to inbound audio facility 106 by means of any standard or proprietary interfaces or connectors, and includes a sampling circuit 136 for producing a sample signal 125 and a mixer circuit 137 for producing a return signal 126.

Sample signal 125 is an attenuated version of outbound signal 104 which is routed back into digital media terminal 101 as a component of return signal 126 through mixer circuit 137, in order to enable a content identification process within digital media terminal 101 for audience measurement purposes. Mixer circuit 137 allows inbound signal 105 (if present) to be routed as well to digital media terminal 101 as another component of return signal 126, in order to enable the usual purpose for which audio sensing device 111 is used (e.g. a mobile telephone's microphone included in a headset). Return signal 126 configures hence a mix of inbound signal 105 and sample signal 125, and is routed back into digital media terminal 101 via a signal path connected to standard inbound audio facility 106 (e.g. a wire or connector), in replacement of original inbound signal 105.

In those cases in which inbound signal 105 exists (according to the application of digital media terminal 101), return signal 126 produced by loop back device 124 contains—most of the time—either sample signal 125 or inbound signal 105, in mutual exclusivity, due to the users' natural tendency of receiving or generating audio at different, alternate times. It will be apparent to those skilled in the art that, in some applications of the invention, inbound signal 105 may not be present all the time, or may not be present at all. For example, the invention may be applied to capturing exposure to media in a desktop PC computer setup in which no microphone is installed nor used (e.g. a Windows Media Center PC used only for rendering media but not for personal intercommunication applications). In such case inbound signal 105 is inactive all (or most) of the time; however the invention still solves the problem of capturing a sample of outbound signal 104 and routing it back to the digital media terminal for audience measurement purposes, via standard audio resources available in most DMT devices, without substantially modifying the way such devices are used according to its original intended purposes.

The audio material to be identified is hence contained in return signal 126 and made available at standard inbound streams within digital media terminal 101, so that it can be read by capturing software 134 by reading inbound streams within an operating environment running in digital media terminal 101. Such task may be accomplished by standard routines as those used for recording audio in media terminal 101, being its compatibility assured by being basic operating services available in all types of DMTs. Capturing software 134 may record return signal 126 and store it in memory 109 for later retrieval, or may produce signatures from return signal 126 for later identification through correlation techniques, or may as well process return signal 126 "on the fly" to detect embedded or watermarking codes previously inserted in the broadcast path for content identification, storing in this case the detected codes in memory 109 for later retrieval, or use a combination of known content identification methods. In most operating environments, capturing software 134 may continuously read streams produced by inbound audio facility 106 independently and concurrently with any other software applications running in media terminal 101 that require its use for other purposes (e.g. a voice recording software application running in background mode within digital media terminal 101).

Sampling circuit 136 produces a sample signal 125 attenuated enough to minimize any undesirable feedback to a remote subject in inter-communication applications (e.g. mobile phone applications), but still producing a signal strong enough to be detected by the chosen content identification method.

Figure 4:
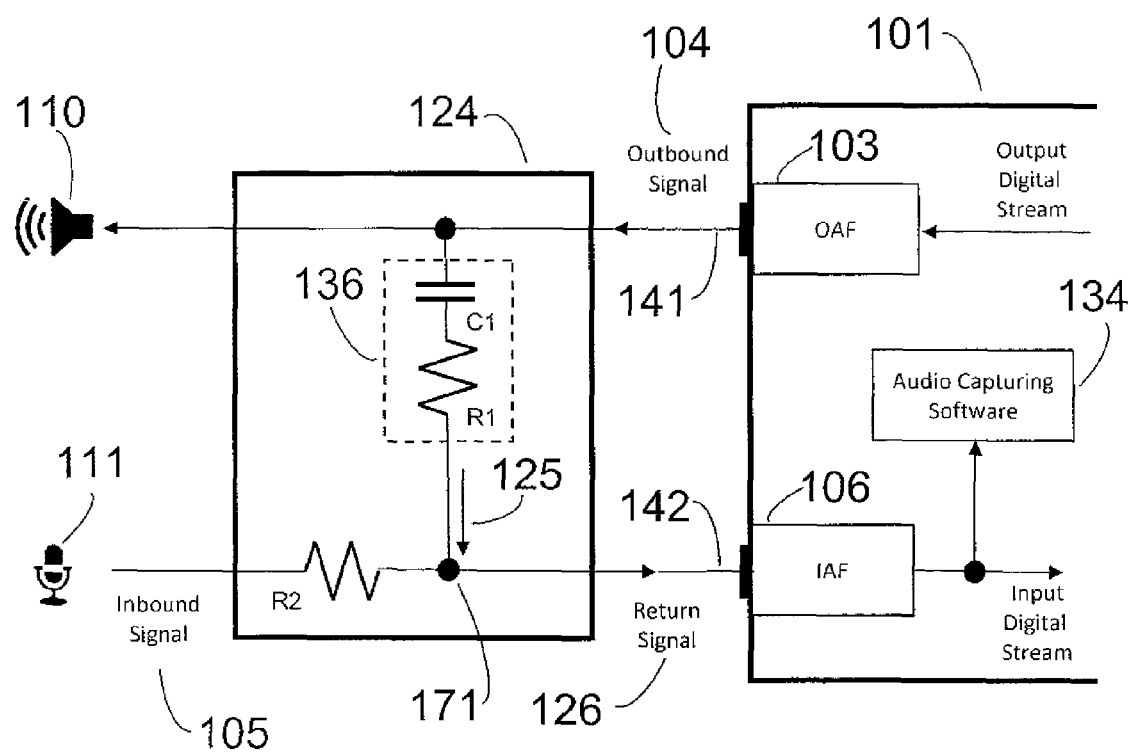
FIG. 4 is a diagram of a first embodiment of the invention.

FIG. 4 shows a diagram of a first embodiment of the invention including a passive electronic mesh comprising condenser C1 and resistors R1 and R2. As shown in FIG. 4, sampling circuit 136 is configured by condenser C1 and resistor R1 connected between output wire 141 carrying outbound signal 104 and input wire 142 carrying return signal 126. Resistor R2 connects the wire carrying inbound signal 105 (if available) to mixer circuit 137, which is implemented by means of a simple current summing node 171, where the signals contributed by resistors R1 and R2 are added to produce return signal 126. Return signal 126 is routed to digital media terminal 101 through standard inbound audio facility 106.

The value of all electronic components must be defined in order to produce a compromise between the following requirements:

Condition (1): the strength of sample signal 125 within return signal 126 must be strong enough to allow effective content identification by the method in use; and, Condition (2): the strength of sample signal 125 within return signal 126 must be low enough as to avoid oscillations or significant echo effects when digital media terminal 101 is used for applications other than consuming media (for example, mobile phone or other intercommunication applications).

Figure 3:
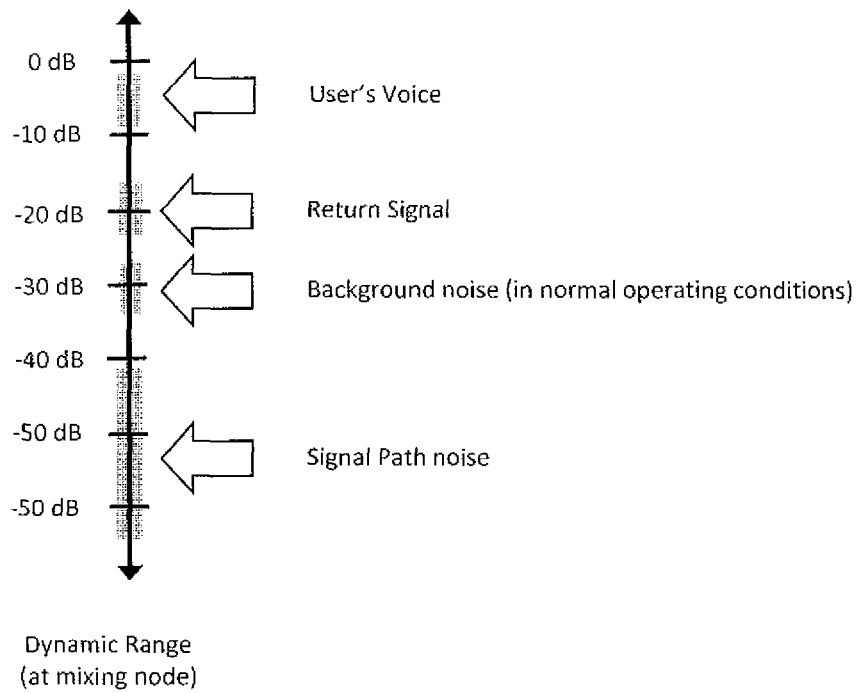
FIG. 3 is a diagram showing dynamic levels of signals involved in operating the invention.

The satisfaction of condition (1) depends mostly on the noise floor produced by the inevitable background audio captured by audio sensing device 111 (if present). In most practical applications of the invention, audio sensing device 111 happens to be designed to capture sound waves typically from a few centimeters away from the user's mouth (e.g. a microphone incorporated in a headset or earphone). Such sound level produced by audio sensing device 111 in normal operating conditions (e.g. when a user is speaking into a microphone) will be referred to as "normal inbound level", while the sound level produced by background noise sources in the same operating conditions will be referred to as "normal background noise level". It can be observed that in most practical cases the normal background noise level falls typically at 25-30 decibels below normal inbound level, as shown in FIG. 3. This is explained by the power and intensity loss suffered by sound waves as they are propagated over the air, and by the fact that users would usually not be able or would not choose to consume media in situations where they cannot hear the desired audio material with enough clarity, respect to the background noise. This creates room within the dynamic range of return signal 126 to insert sample signal 125 (or a derivative thereof) at a power level high enough to enable a content identification process, but still low enough to prevent disturbing a user of digital media terminal 101 when audio facility 106 is required for other purposes (e.g. phone communications).

Using FIG. 3 as a guideline, if the value of components is set such that sample signal 125 enters mixing circuit 137 (i.e. node 171) at, for example, 20 decibels below the normal inbound level (see FIG. 3), in most practical cases it ends up at about 10 decibels above the normal background noise level, which is enough to enable content identification (assuming the use of appropriate content identification methods).

Regarding condition (2), it can be observed that in the vast majority of applications regarding media consumption inbound audio facility 106 remains idle for any period of time devoted to media consumption. As explained in the summary section, this is because of the natural propensity of users of employing outbound/inbound audio facilities alternatively while operating a DMT, and because most operating environments do not preclude the use of inbound audio facilities while outbound audio facilities are in use by some other application. On the other hand, when/if digital media terminal 101 is used for voice inter-communications, it has been observed that most digital intercommunication systems and services, whether based on circuit-switching or data networks of any kind, typically provide quite effective echo cancellation services, usually effective enough to eliminate (or at least substantially reduce) any undesired echo effect.

It will be apparent to those skilled in the art that a large number of alternative circuits may be used to obtain a comparable result. The above implementation is provided herein as an exemplary circuit that is able to provide satisfactory results in most operating conditions, having at the same time the advantage of minimum part count, minimum manufacturing costs and minimum operating costs.

Figure 5:
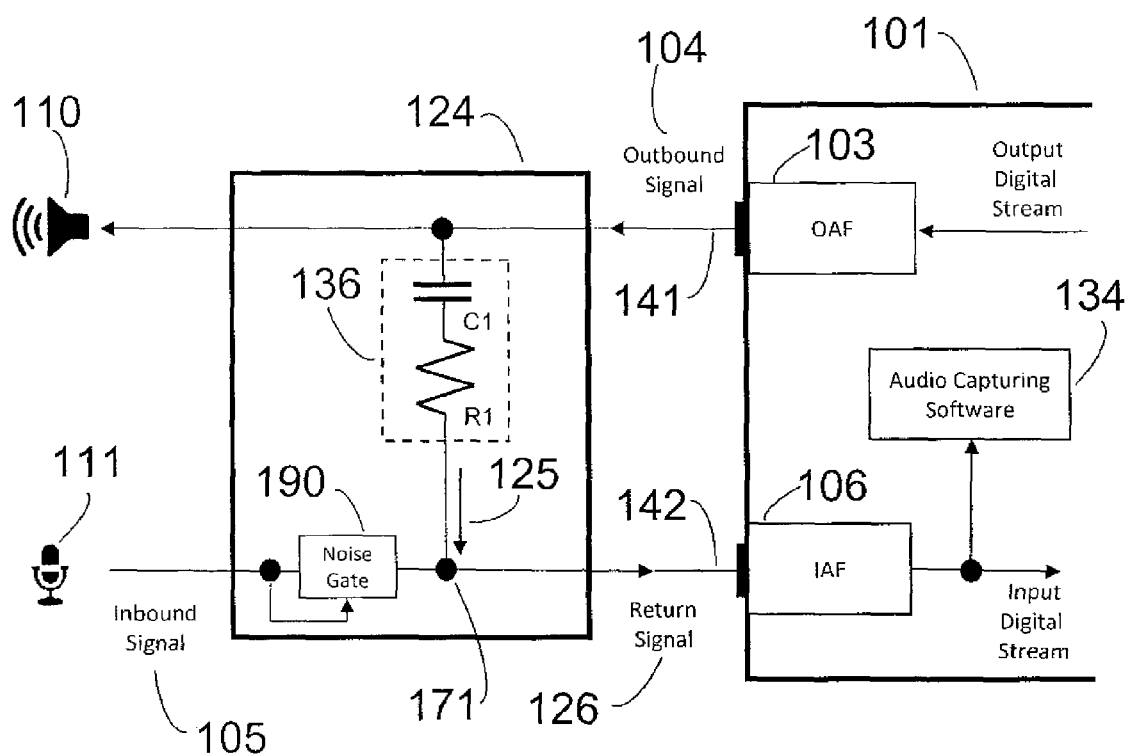
FIG. 5 is a diagram of a second embodiment of the present invention, utilizing active circuits for improved performance.
Figure 6:
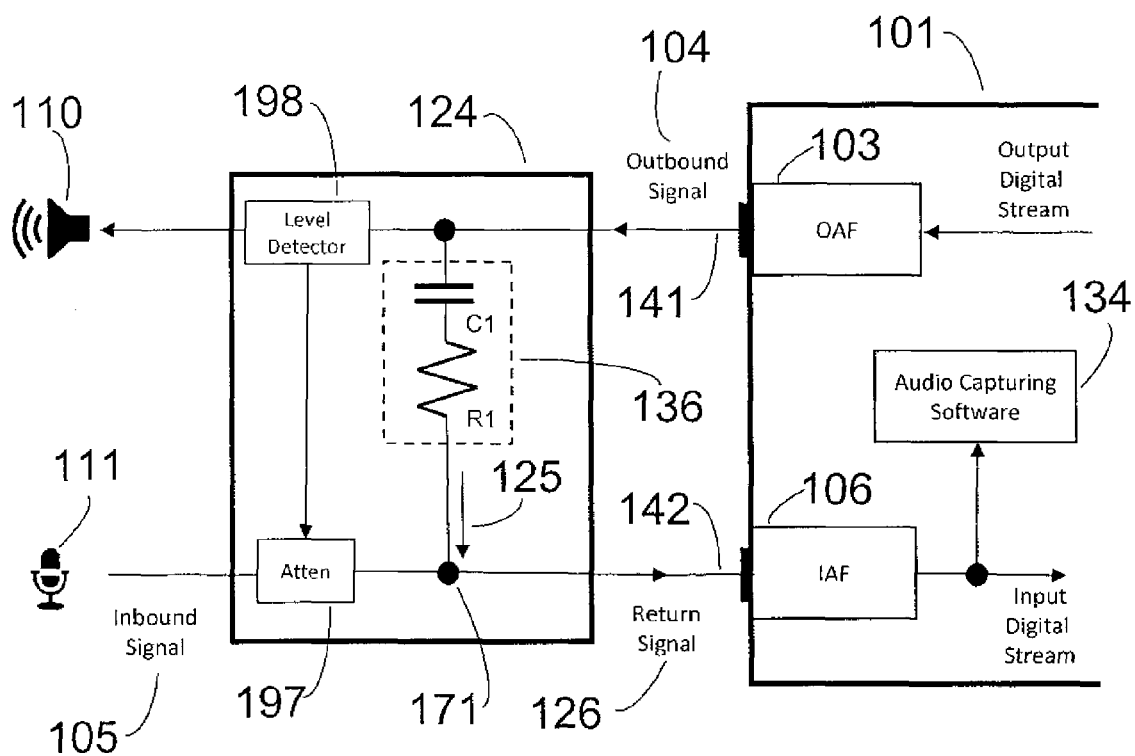
FIG. 6 shows a diagram of a third embodiment of the present invention, also utilizing active circuits.

Alternative embodiments of loop-back device 124 are also possible that utilize active components to further improve its performance in highly-noisy environments, as shown in FIGS. 5 and 6. For example, a variable attenuator may be used in place of resistor R2 to achieve a more dynamic control of the amount of inbound signal 105 mixed with sample signal 125, according to a sound level indication detected in the same inbound signal 105 produced by audio sensing device 111. As shown in FIG. 5, such embodiment of loop-back device 124 includes noise gate 190 that monitors the signal level at inbound signal 105 and allows it to flow forward into node 171 only when it complies with predefined conditions (e.g. exceeds a predefined threshold). Such functionality enables inbound signal 105 only at those times at which a user is perceived as wishing to talk (i.e. relatively high sound power detected at sensing device 111), preventing background noise from staining return signal 126 at every other time. It will be apparent to those skilled in the art that more sophisticated transfer functions for noise gate 190 can be defined to optimize the overall result in most conditions. For example, attack and release times of noise gate 190 may be adjusted to reduce any undesirable effects while using digital media terminal 101 for conversation. In this sense, a short attack time is recommended so that the user does not feel any impediment for communicating, while a relatively long release time may be helpful in providing a more natural feel to the counterparty during a conversation. Again, it is observed that audio content consumers usually do not speak while they are hearing, except for certain specific activities such as, for example, karaoke singing or studio recording applications, in which case the use of loop-back device 101 would neither be recommended nor necessary.

FIG. 6 shows yet another embodiment of loop-back device 124 using active circuits including as well a variable attenuator on the signal path of inbound signal 105, although in this case the level indication is derived from outbound signal 104. For this purpose, a level detector circuit 198 is included that activates a signal attenuator 197 when a certain level of activity is detected in outbound signal 104 (e.g. when the power level indication exceeds a predefined threshold). Being observed that human beings cannot hear and speak at the same time during any application requiring speaking and hearing (e.g., a conversation) attenuating inbound signal 105 while outbound signal 104 is active (i.e. media is flowing out of the DMT or the remote end may be speaking) does not have a perceivable effect from the user's point of view, still enhancing the performance of loop-back device 124 by further protecting the "integrity" of return signal 126 from ambient noise captured by audio sensing device 111 during media consumption sessions. The embodiments depicted in FIGS. 5 and 6 can also be combined in a single embodiment to provide a more elaborate control of the amount of inbound signal 105 introduced in return signal 126. Further possible enhancements will be apparent regarding the derivation of sample signal 125, which may include additional active elements for modifying sample signal 125 in terms of equalization, dynamics (e.g. compression) or any other processing that may be required to optimize return signal 126, according to what is prescribed by the chosen content identification method.

Figure 7A:
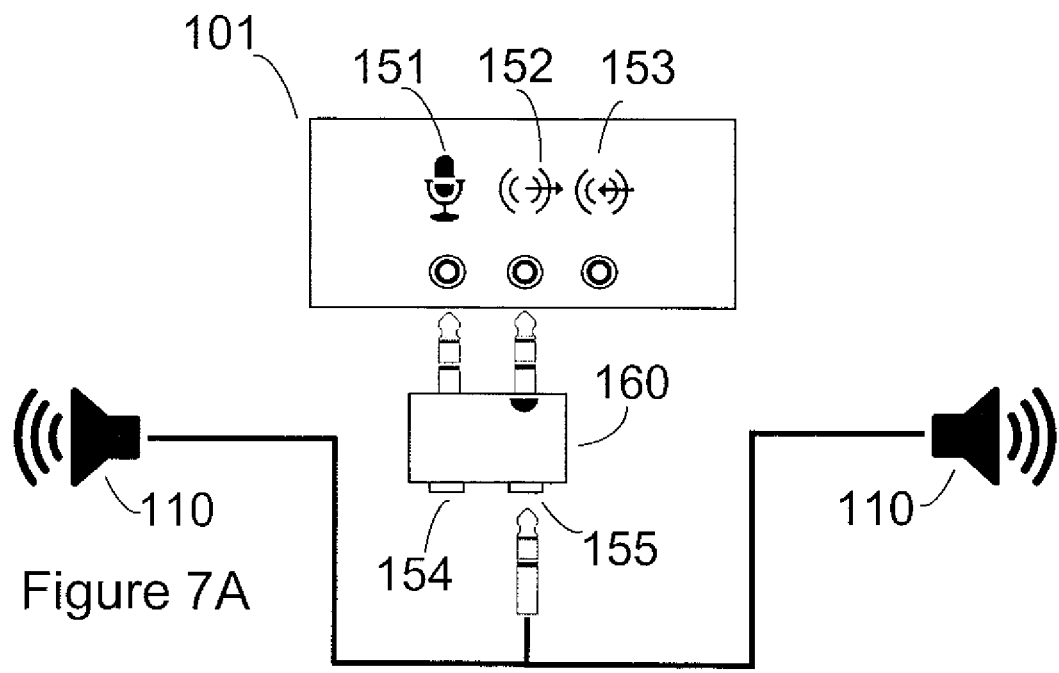
FIGS. 7A and 7B depict embodiments of the present invention, embodied in standard audio connectors.
Figure 7B:
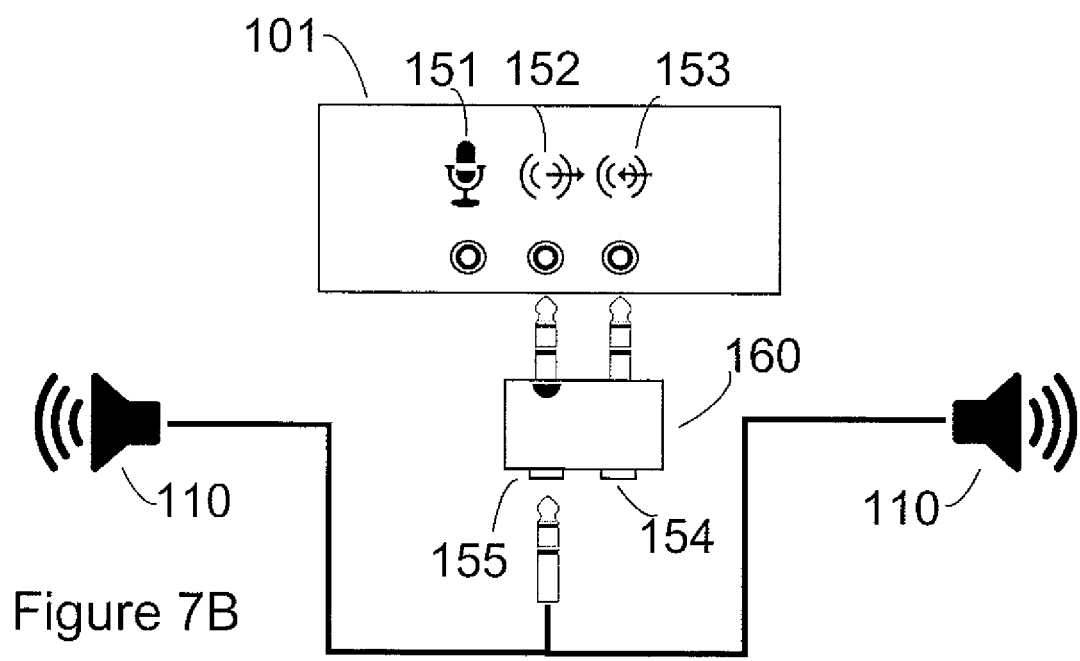

FIGS. 7A and 7B depict an example of realization of the present invention aimed to monitoring media consumption through the use of desktop personal computers or similar digital terminals. FIG. 7A shows standard 3.5 mm audio input and output connectors of digital media terminal 101, including a microphone connector 151, a stereo audio output connector 152 and a stereo line-in connector 153. Loop-back device 124 (not shown in the picture) is embodied in an apparatus 160 housing standard 3.5 mm plugs that are inserted in standard microphone connector 151 and to the stereo audio output connector 152. A visible mark is included in apparatus 160 to easily remind the user about which one of the connectors should be inserted in the standard output jack of the DMT. Apparatus 160 further includes two 3.5 mm jacks 154 and 155 which allow for the connection of an external audio sensing device (if any) and an external audio rendering device 110 (e.g., a pair of headphones or a set of speakers). FIG. 7B shows apparatus 160 connected in an alternative way in which the loop-back circuit is implemented between stereo audio output connector 152 and stereo line-in connector 153, and connectors 154 and 155 allow for the connection of an external audio rendering device 110 (e.g., a pair of headphones, or a set of speakers) and an external audio source.

Figure 8:
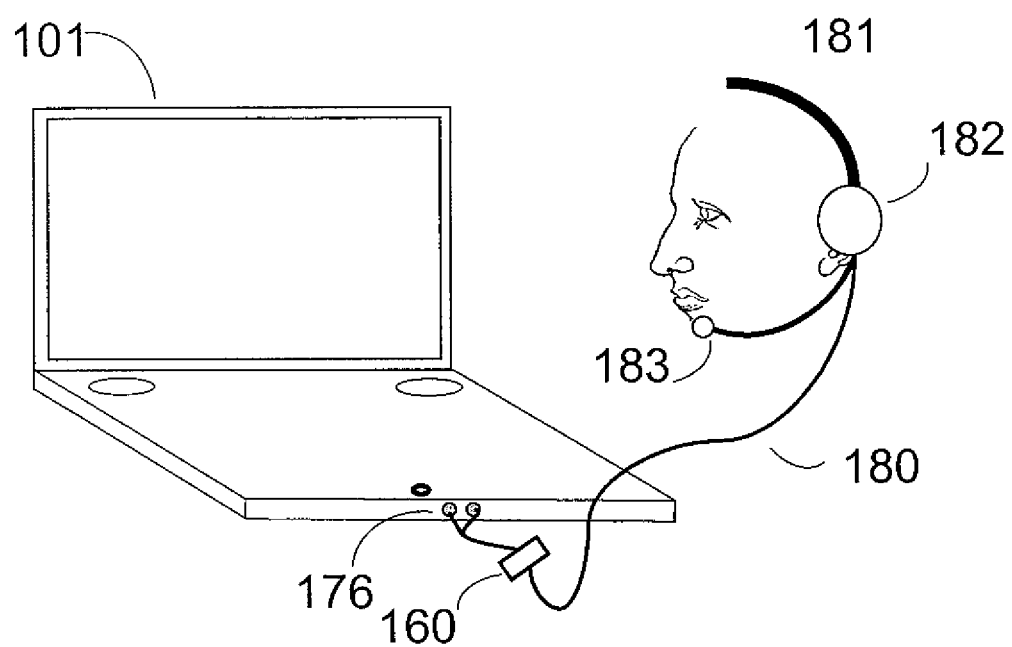
FIG. 8 depicts yet another embodiment of the present invention, in this case embodied in standard headphones.

FIG. 8 depicts another example of realization of the invention where apparatus 160 is implemented as part of a personal media-rendering device, in FIG. 8 exemplified as headphone 181. This particular embodiment is convenient for applying the invention in the measurement of media consumption through the use of laptop PCs and some types of hand-held devices (for example "smart" mobile phones). Headphone 181 of the invention may be easily derived from an existing headphone device by inserting loop-back device 124 in the headphone cable 180, through a relatively simple manufacturing process applied on off-the-shelf commercial units. In this way, headphone 181 is connected to digital media terminal 101 through its own original connectors 176. Headphones of the kind of headphone 181 may be gifted to individuals participating in audience measurement panels as an extra incentive to cooperate in the measurement process, ensuring that return signal 126 is always available while users are exposed to media through that consumption mode. Any of the alternatives described herein for realization of loop-back device 124 can be used in this particular embodiment.

Figure 9A:
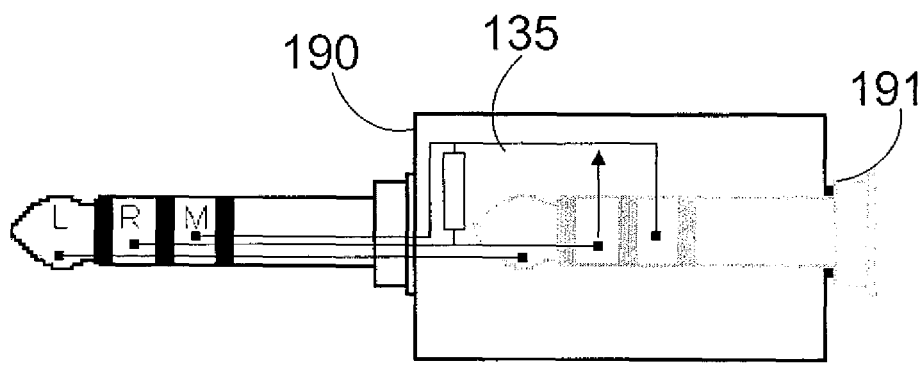
FIGS. 9A and 9B illustrate yet another embodiment of the present invention, in this case embodied in an accessory for a mobile-phone.
Figure 9B:
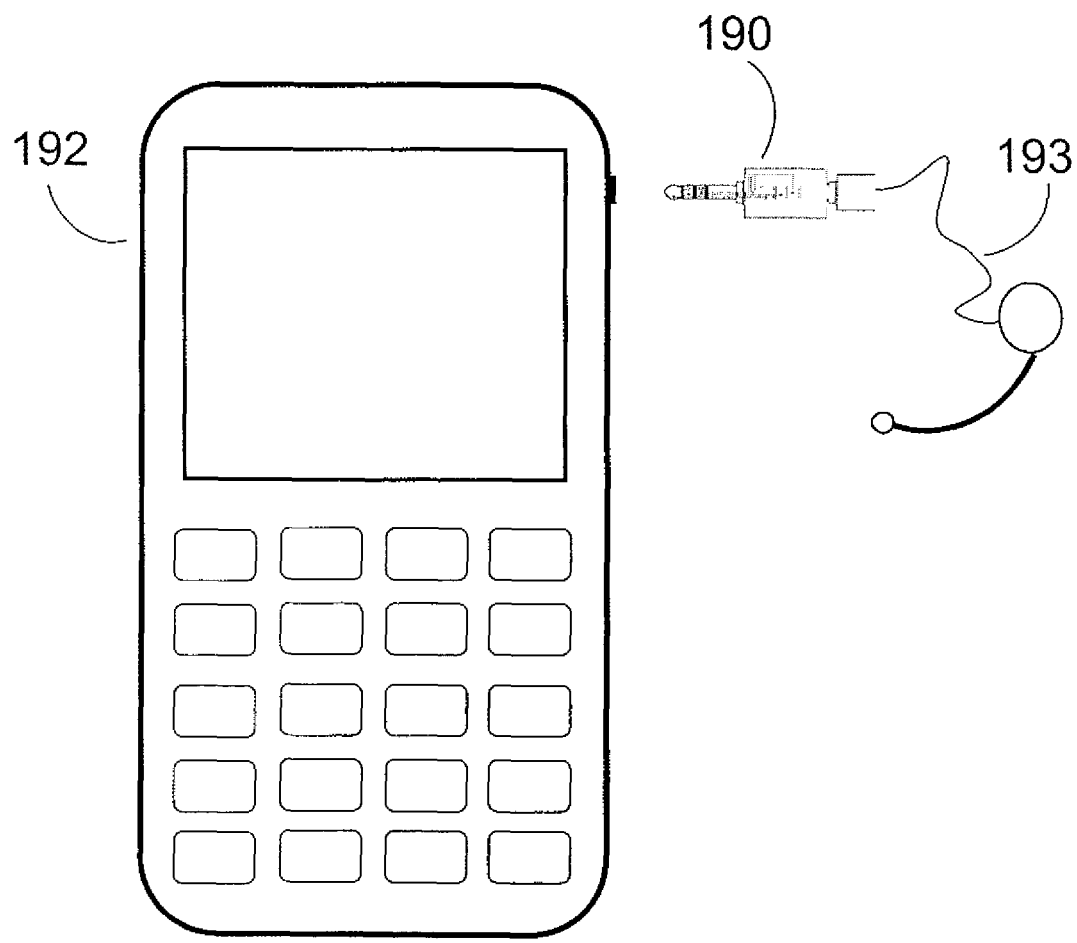

FIG. 9A depicts yet another embodiment of the present invention wherein apparatus 160 of FIGS. 7A, 7B and 8 is embodied in apparatus 190 taking the shape of a single plug-jack combination device, as shown in FIG. 9A. Any of the alternatives described herein for realization of loop-back device 124 can be used in this particular embodiment. Apparatus 190 includes a jack connector 191 which allows for connecting a plug similar to the one included in the same apparatus, allowing realizing the invention using standard (i.e. unmodified) headphones or headsets. A standard 3.5 mm jack type of connector is shown as an example in FIGS. 9A and 9B, although it should be apparent that apparatus 190 can be implemented with many other types of connectors, both standard and proprietary. This particular embodiment is convenient when the invention is applied to monitor media usage in a mobile communication device (192 in FIG. 9B with and its associated headset 193).

Figure 10:
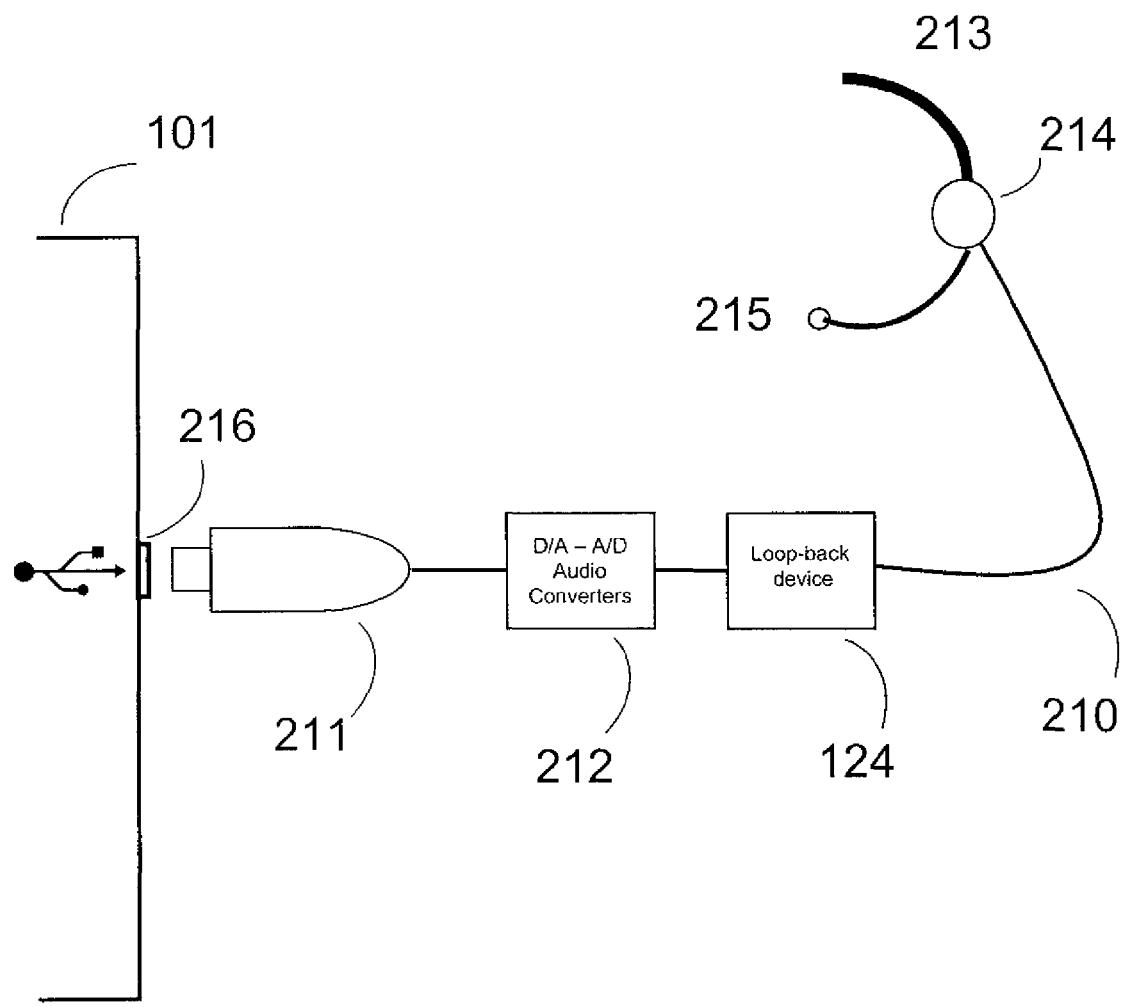
FIG. 10 is an illustration of yet another embodiment of the present invention, in this case embodied in a headphone using a digital audio interface (e.g. "USB audio").

FIG. 10 depicts yet another embodiment of the present invention in association with a "USB headset". Many headsets are offered today in the markets that are not connected to a DMT through simple analogue audio connectors, but through a digital link, for example a USB port. Such headphones include a complete "audio card" circuit inside the USB connector or the headset's cable where all the A/D and D/A conversion takes place, while all communication with the host DMT happens in digital form.

FIG. 10 depicts such embodiment, where a USB connector 216 is used as a communication port with the DMT. As show in FIG. 10, in this case the loop-back device 124 can be conveniently implemented after the D/A conversion stage 212 acting in the analogue domain as described in the various examples herein. This embodiment is convenient in those cases in which a panel member has already a USB headphone and wishes to continue to use a similar technology for his/her media consumption activities.

Figure 11:
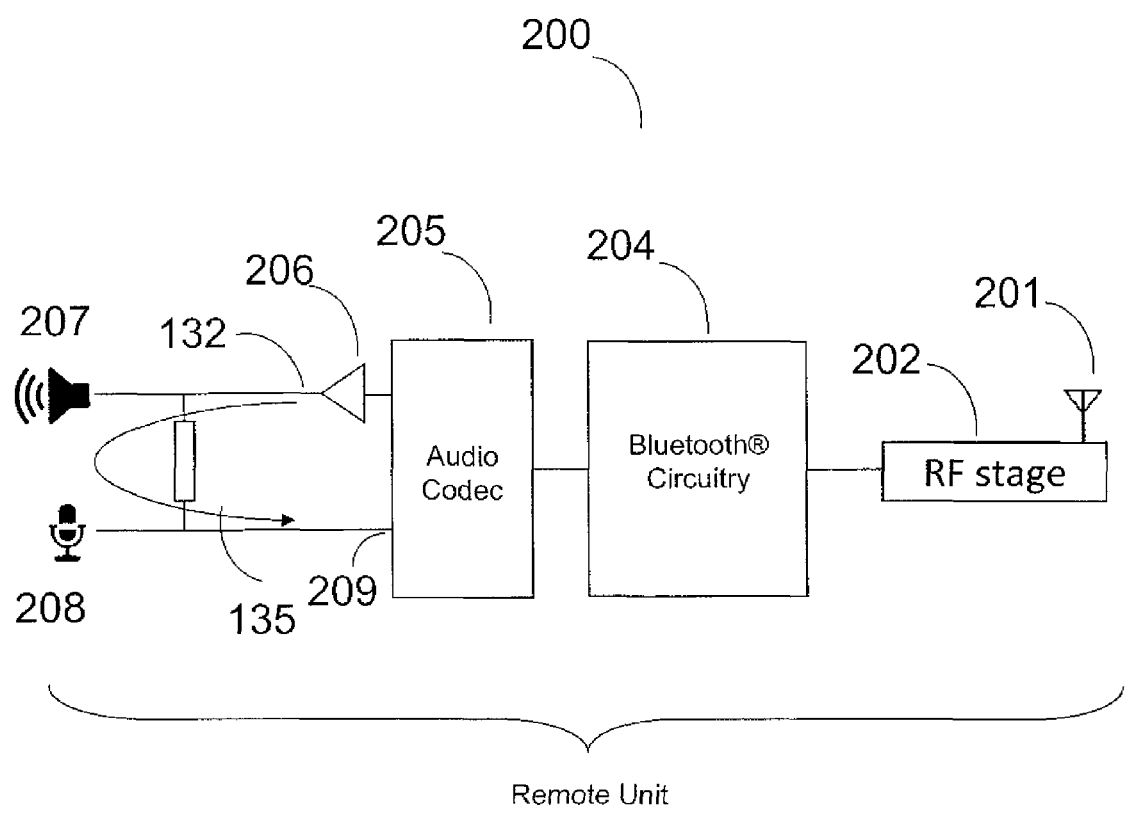
FIG. 11 is a block diagram of yet another embodiment of the present invention, in this case embodied in Bluetooth-enabled headphones.

The present invention can be successfully realized even in a wireless personal rendering device. Wireless headsets have become very popular thanks to the advent of low-cost wireless technologies like Bluetooth. A wireless headset comprises a remote unit including one or two small speakers and optionally a microphone (if it is intended for use in personal telecommunications). In such cases, loop-back device 124 can be advantageously housed in the remote unit in proximity of the speakers (audio rendering devices) and microphone (audio sensing device, if available). Such embodiment of the invention is shown in FIG. 11, implemented in an exemplary Bluetooth® headset 200, shown in the figure as composed of: antenna 201, radio-frequency stage 202, Bluetooth® circuitry 204, audio codec 205, signal amplifier 206, earphones 207 and a microphone 208. Return signal 126 thus generated is automatically processed and transmitted by the above mentioned elements of headset 200 to an associated digital media terminal 101 (not shown in the picture).

The present invention can be advantageously applied in a variety of audience measurement processes that make use of audio content identification technologies, including broadcasted radio and television audiences as well as audiences to downloaded and/or streamed music and/or video, or any other applications where a digital media terminal is used as a media rendering device.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor media presented by a media device, the method comprising:
   adjusting, with a circuit, an inbound audio signal input to the media device based on (i) a level of an outbound audio signal generated by the media device and (ii) a level of the inbound audio signal to produce an adjusted inbound audio signal;
   combining, with the circuit, the adjusted inbound audio signal with a sampled version of the outbound audio signal to determine a return signal; and
   processing the return signal to determine first identification information to identify first presented media having an audio portion corresponding to the outbound audio signal generated by the media device.

2. The method as defined in claim 1, wherein adjusting the inbound audio signal to produce the adjusted inbound audio signal includes attenuating the inbound audio signal to produce the adjusted inbound audio signal when the level of the outbound audio signal satisfies a threshold.

3. The method as defined in claim 1, wherein adjusting the inbound audio signal to produce the adjusted inbound audio signal includes substantially blocking the inbound audio signal when the level of the inbound audio signal does not satisfy a threshold.

4. The method as defined in claim 3, wherein adjusting the inbound audio signal input to produce the adjusted inbound audio signal further includes enabling the inbound audio signal to be combined with the sampled version of the outbound audio signal when the level of the input audio signal satisfies the threshold.

5. The method as defined in claim 1, further including attenuating the outbound audio signal to produce the sampled version of the outbound audio signal.

6. The method as defined in claim 1, wherein the adjusted inbound audio signal with the sampled version of the outbound audio signal includes summing the adjusted inbound audio signal and the sampled version of the outbound audio signal to determine the return signal.

7. The method as defined in claim 1, wherein processing the return signal includes at least one of detecting a watermark included in the return signal or generating a signature from the return signal.

8. A media device comprising:
   an audio circuit to:
      adjust an inbound audio signal input to the media device based on (i) a level of an outbound audio signal generated by the media device and (ii) a level of the inbound audio signal to produce an adjusted inbound audio signal; and
      combine the adjusted inbound audio signal with a sampled version of the outbound audio signal to determine a return signal; and
   an audio processor to process the return signal to determine first identification information to identify first presented media having an audio portion corresponding to the outbound audio signal generated by the media device.

9. The media device as defined in claim 8, wherein the audio circuit includes:
   a detector to detect the level of the outbound audio signal; and
   an attenuator to attenuate the inbound audio signal to produce the adjusted inbound audio signal when the level of the outbound audio signal detected by the detector satisfies a threshold.

10. The media device as defined in claim 8, wherein the audio circuit includes a noise gate to substantially block the inbound audio signal when the level of the inbound audio signal does not satisfy a threshold.

11. The media device as defined in claim 10, wherein the noise gate is to substantially pass the inbound audio signal when the level of the input audio signal satisfies the threshold.

12. The media device as defined in claim 8, wherein the audio circuit includes a sampling circuit to attenuate the outbound audio signal to produce the sampled version of the outbound audio signal.

13. The media device as defined in claim 8, wherein the audio circuit includes a mixing circuit to sum the adjusted inbound audio signal and the sampled version of the outbound audio signal to determine the return signal.

14. The media device as defined in claim 8, wherein the audio processor includes software executable by a central processing unit of the media device to at least one of detect a watermark included in the return signal or generate a signature from the return signal.

15. A media device comprising:
   first circuitry to adjust an inbound audio signal input to a media device based on (i) a level of an outbound audio signal generated by the media device and (ii) a level of the inbound audio signal to produce an adjusted inbound audio signal;
   second circuitry to combine the adjusted inbound audio signal with a sampled version of the outbound audio signal to determine a return signal;
   third circuitry to:
      couple the first circuitry with an input of the media device to access the inbound audio signal; and
      couple the first circuitry with an output of the media device to access the outbound audio signal; and
   means for processing the return signal to determine first identification information to identify first presented media having an audio portion corresponding to the outbound audio signal generated by the media device.

16. The media device as defined in claim 15, wherein the first circuitry includes:
   a detector to detect the level of the outbound audio signal; and
   an attenuator to attenuate the inbound audio signal to produce the adjusted inbound audio signal when the level of the outbound audio signal detected by the detector satisfies a threshold.

17. The media device as defined in claim 15, wherein the first circuitry includes a noise gate to:
   substantially block the inbound audio signal when the level of the inbound audio signal does not satisfy a threshold; and
   substantially pass the inbound audio signal when the level of the input audio signal satisfies the threshold.

18. The media device as defined in claim 15, wherein the first circuitry includes a sampling circuit to attenuate the outbound audio signal to produce the sampled version of the outbound audio signal.

19. The media device as defined in claim 15, wherein the second circuitry includes a summing node to sum the adjusted inbound audio signal and the sampled version of the outbound audio signal to determine the return signal.

20. The media device as defined in claim 15, wherein the input of the media device is an audio input, the output of the media device is an audio output, and third circuitry includes:
   a first connector to interface with the audio input; and
   a second connector to interface with the audio output.

\* \* \* \* \*